US008498903B2

(12) United States Patent
Edwards

(10) Patent No.: US 8,498,903 B2
(45) Date of Patent: Jul. 30, 2013

(54) SYSTEM AND METHOD FOR PERFORMING A SECURITY CHECK AT A CHECKOUT TERMINAL

(75) Inventor: Thomas V. Edwards, Suwanee, GA (US)

(73) Assignee: NCR Corporation, Duluth, GA (US)

( * ) Notice: Subject to any disclaimer, the term of this patent is extended or adjusted under 35 U.S.C. 154(b) by 0 days.

(21) Appl. No.: 13/248,697

(22) Filed: Sep. 29, 2011

(65) Prior Publication Data

US 2013/0085878 A1 Apr. 4, 2013

(51) Int. Cl.
*G06Q 20/20* (2012.01)

(52) U.S. Cl.
USPC .................. 705/23; 705/16; 705/21; 705/18; 235/492; 340/572.1; 177/25.15

(58) Field of Classification Search
USPC ........... 705/16, 21, 23, 18; 235/379; 713/170, 713/168; 380/263
See application file for complete search history.

(56) References Cited

U.S. PATENT DOCUMENTS

| | | | | |
|---|---|---|---|---|
| 5,115,888 | A * | 5/1992 | Schneider | 186/61 |
| 5,493,613 | A * | 2/1996 | Denno et al. | 705/73 |
| 5,877,485 | A * | 3/1999 | Swartz | 235/383 |
| 6,047,262 | A * | 4/2000 | Lutz | 705/16 |
| 6,758,393 | B1 * | 7/2004 | Luciano et al. | 235/379 |
| 7,672,871 | B2 * | 3/2010 | Brenhouse | 705/16 |
| 7,853,477 | B2 * | 12/2010 | O'Shea et al. | 705/14.1 |
| 7,912,765 | B2 * | 3/2011 | Kadaba et al. | 705/28 |
| 2009/0307097 | A1 * | 12/2009 | De Faria | 705/17 |

* cited by examiner

*Primary Examiner* — Vanel Frenel
(74) *Attorney, Agent, or Firm* — Dana T. Hustins; Harden E. Stevens, III

(57) ABSTRACT

A system and method for performing a security check at a checkout terminal is disclosed. Various heuristics are utilized to verify that a customer or clerk has properly identified an item being purchased. In various embodiments, the weight or other physical characteristics of an item placed on a product scale are measured and compared with expected physical characteristics for the item. If a mismatch is detected between the actual physical characteristics and the expected physical characteristics, the transaction may be flagged for further investigation.

20 Claims, 9 Drawing Sheets

SYSTEM AND METHOD FOR PERFORMING A SECURITY CHECK AT A CHECKOUT TERMINAL

BACKGROUND OF THE INVENTION

In the retail industry, self-service checkout terminals and assisted checkout terminals are used to tabulate the prices for the items chosen by a customer for purchase and to present the customer with a grand total price at the end of the transaction. Many of such checkout terminals comprise a product scale that is used to weigh an item that is sold by weight (e.g., for a fixed price per pound.) When the customer (or a clerk) places an item on the product scale, the customer or clerk must often enter a product lookup code (PLU) into the checkout terminal or otherwise identify the weighed item to the checkout terminal. It is known that unscrupulous persons sometimes seek to fraudulently enter an incorrect PLU into the checkout terminal in order to minimize the cost registered by the checkout terminal for a given item. For example, a customer at a self-service checkout terminal may place a beef steak on the product scale but enter the PLU code for bananas. If the beef steak were selling for $8.99 per pound but the bananas were selling for $0.99 per pound, then the customer would fraudulently save $8 per pound on the beef steak. In another example, the customer could place an expensive (yet light-weight) item on the product scale such as a digital versatile disc (DVD) containing a copyrighted movie and enter in a PLU code for a produce item (such as bananas) selling for a very low price per pound.

Such problems are especially acute for self-service checkout terminals where the customer can enter the PLU code into the checkout terminal himself. Yet the problem can also occur at traditional assisted checkout terminals if the clerk at the terminal acts in collusion with the customer. It is well known that unscrupulous clerks sometimes assist their friends or acquaintances to obtain items at low cost by improperly identifying the items using a PLU code or other means.

SUMMARY OF THE INVENTION

The system and method described herein provides a manner of conducting a security check for items (such as produce) that are sold by weight. In various embodiments of the invention, different heuristics are utilized to verify that the item being weighed has been properly identified by the customer or clerk. In some embodiments, the weight of the item is cross-checked with an expected range of normal weights for that item based on past shopping history. If the weight of the item falls outside the expected range, the transaction can be flagged for further investigation or verification. In some embodiments, the frequency that a given PLU is entered into the checkout terminal (during the same transaction or across multiple transactions) is cross-checked with normal buying patterns. If an anomaly is detected, the transaction can likewise be flagged as suspicious. In some embodiments, the physical characteristics of a weighed item are captured using a video camera or other sensing device. Thereafter, these physical characteristics are compared with expected physical characteristics of the item and the transaction can be flagged if it is suspicious. In some embodiments, the customer's shopping history is used to build a typical shopping profile for the customer and tailor the system and method using the customer's personalized shopping history, thus minimizing the likelihood of false alarms for the particular customer.

DETAILED DESCRIPTION

Self-service checkout terminals and assisted checkout terminals for use in the retail industry are well-known to those of skill in the art. As discussed herein, a self-service checkout terminal is a checkout terminal in which the customer is primarily responsible for checking out his or her items, with limited or no assistance from a clerk. By contrast, an assisted checkout terminal is a checkout terminal in which a clerk is primarily responsible for checking out the customer's items and otherwise operating the checkout terminal.

Various checkout terminals suitable for use with the present invention are described in U.S. Pat. Nos. 4,779,706; 5,952,642; 5,967,264; 6,032,128; 6,215,078; 6,550,582; 6,394,345; 6,502,749; and 6,644,547. The contents of the aforementioned patents are hereby incorporated by reference herein.

Figure 1:
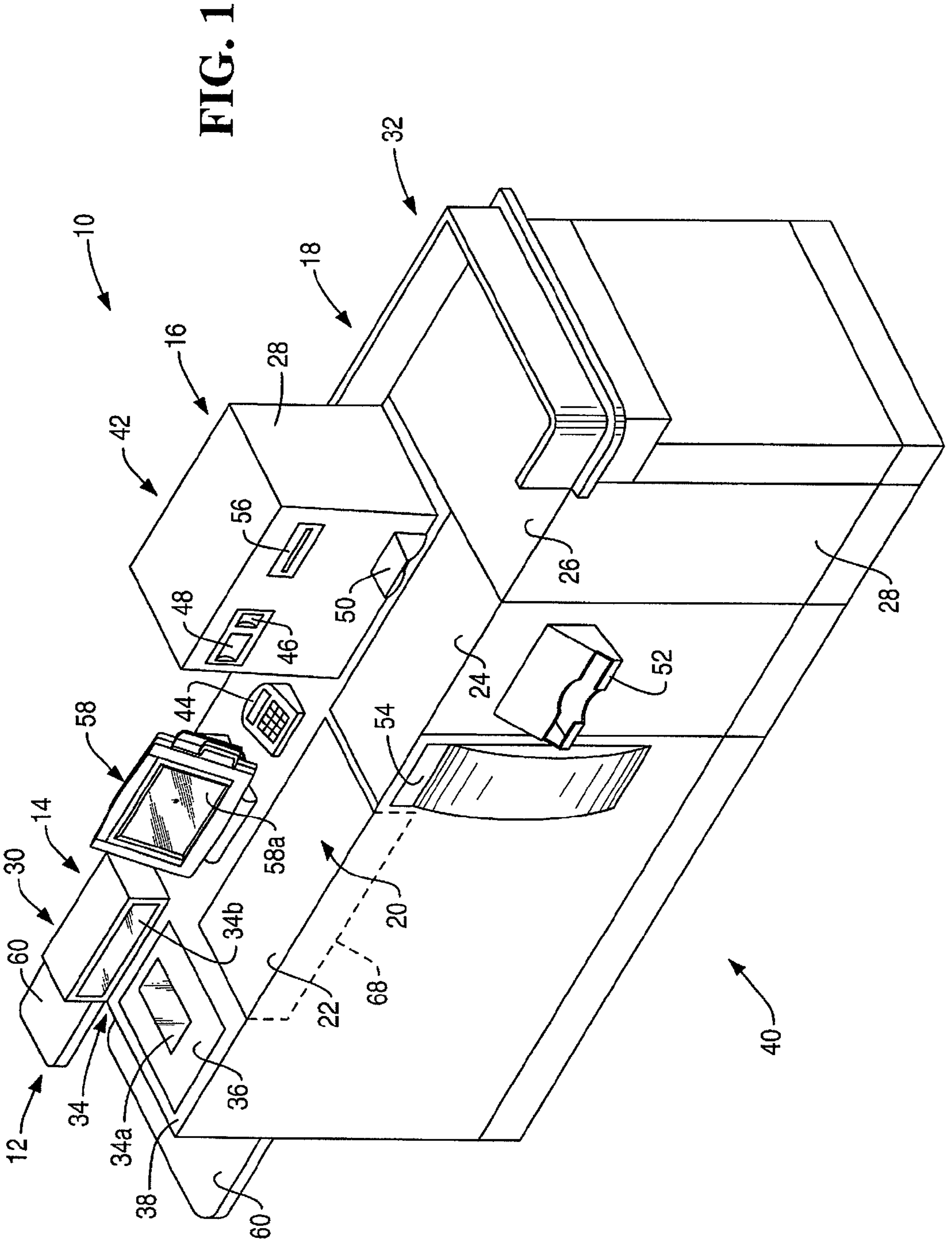
FIG. 1 is a perspective view of a self-service checkout terminal suitable for use with the present invention.
Figure 2:
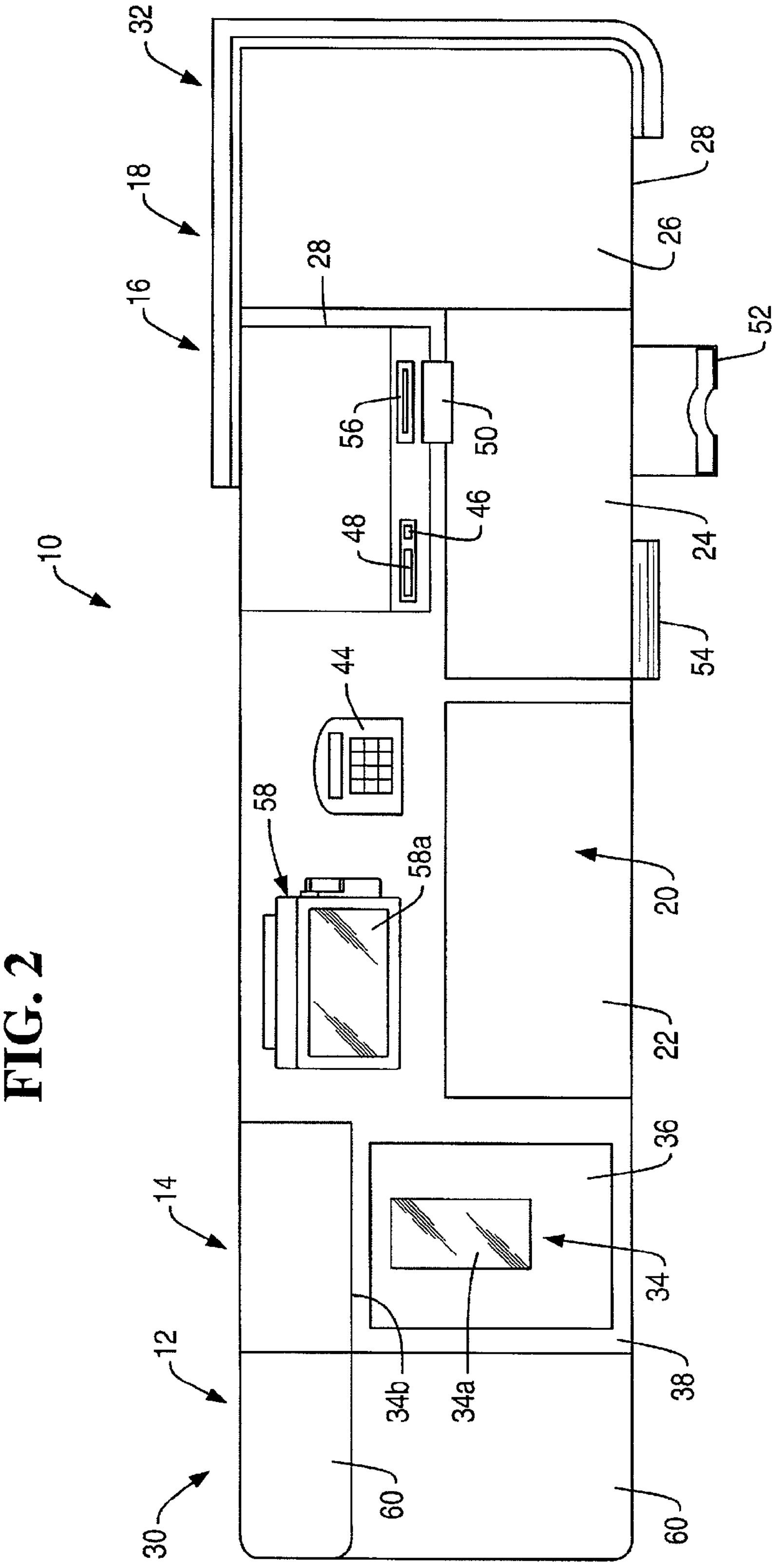
FIG. 2 is a top plan view of the self-service checkout terminal of FIG. 1.

Turning now to FIGS. 1 and 2, a self-service checkout terminal 10 suitable for use with the present invention is shown. The self-service checkout terminal 10 includes a pre-scan area 12, an itemization area 14, a payment area 16, and a post-scan area 18. The self-service checkout terminal 10 also includes an item transport mechanism such as belt assembly 20 which includes a security belt mechanism 22 and a takeaway belt mechanism 24. The belt assembly 20 is utilized to convey items for purchase toward a item collection surface or area 26 of the post-scan area 18 subsequent to scanning of the items by a user of the self-service checkout terminal 10 (e.g. a customer).

The self-service checkout terminal 10 also includes a terminal base 28 for supporting the components associated therewith. The terminal base 28 may be embodied as a single cabinet-type structure or, alternatively, may be embodied as a number of separate structures secured to one another. The terminal base 28 has an upstream end portion 30 and a downstream end portion 32. The terms "upstream" and "downstream" are used herein to be consistent with the flow of items through the self-service checkout terminal 10 during a typical checkout procedure. In particular, an item enters at the area proximate the pre-scan area 12 then flows in a downstream direction to be scanned or otherwise entered at the itemization area 14. Once the item is scanned or otherwise entered at the itemization area 14, the item flows from the itemization area 14 in a downstream direction to the post-scan area 18 via the belt assembly 20.

The terminal 10 also includes a user side 40 and a rear side 42. More specifically, the terminal base 28 divides the self-service checkout terminal 10 into the user side 40 which is the side of the self-service checkout terminal 10 where the customer is positioned during a checkout transaction, and the rear side 42 which is the opposite side of the self-service checkout terminal 10. The pre-scan area 12 of the self-service checkout terminal 10 is located in the upstream end portion 30 of the terminal base 28. The pre-scan area 12 includes a number of shelves and cart-docking components 60 which may be utilized to support a shopping basket or the like (not shown) and/or dock with a shopping cart or the like (not shown).

The itemization area 14 of the self-service checkout terminal 10 is also located on the upstream end portion 30 of the terminal base 28 and includes a scanner 34 and a product scale 36. If an item such as produce is placed upon the product scale 36, the product scale 36 may be used to determine the weight of the item. The itemization area 14 also preferably includes a video camera or still camera (not shown) to continuously or selectively photograph items placed on product scale 36 and/or scanned by scanner 34. In some embodiments, alternate sensing devices can be used in addition to, or in lieu of, a camera. For example, some embodiments can utilize x-ray detectors, infrared detectors, capacitive sensors, olfactory (smell) detectors, ultrasound detectors, or other sensors to detect various physical characteristics of the item being placed on the product scale 36 and/or scanned by scanner 34.

The scanner 34 conventionally scans or reads a product identification code such as a Universal Product Code (UPC) or other bar code, industrial symbol(s), alphanumeric character(s), or other indicia associated with an item to be purchased. One scanner which may be used is a model number 5875 bi-optic scanner which is commercially available from NCR Corporation of Duluth, Ga. The scanner 34 preferably includes a first scanning window 34*a* and a second scanning window 34*b*. The first scanning window 34*a* is disposed in a substantially horizontal manner, whereas the second scanning window 34*b* is disposed in a substantially vertical manner, as shown in FIG. 1

The scanner 34 also includes a light source (not shown) such as a laser, a rotating mirror (not shown) driven by a motor (not shown), and a mirror array (not shown). In operation, a laser beam reflects off the rotating mirror and mirror array to produce a pattern of scanning light beams. As the product identification code on an item is passed over the scanner 34, the scanning light beams scatter off the code and are returned to the scanner 34 where they are collected and detected. The reflected light is then analyzed electronically in order to determine whether the reflected light contains a valid code pattern. If a valid code pattern is present, the product identification code may then be utilized to retrieve product information associated with the item (e.g. the price of the item and the weight of the item).

The payment area 16 of the self-service checkout terminal 10 includes the system components necessary to allow a customer to perform finalization functions such as tendering payment for his or her items for purchase and printing of transaction receipts. In particular, the payment area 16 of the self-service checkout terminal 10 includes an electronic payment terminal 44 having a card reader and keypad, a pair of currency acceptors such as a coin acceptor 46 and a bill acceptor 50, a corresponding pair of currency dispensers such as a coin dispenser 48 and a bill dispenser 52, and a receipt printer 54. Moreover, the payment area 16 of the self-service checkout terminal 10 may also be configured to include a coupon acceptor 56. The coupon acceptor 56 allows a customer to tender coupons, vouchers, or the like during operation of the self-service checkout terminal 10.

The self-service checkout terminal 10 may also include a security scale 68. The security scale 68 is a weight scale which monitors the weight of items positioned on the belt associated with the security belt mechanism 68. In some embodiments, the self-service checkout terminal 10 may also include a light pole and a status light device as described in U.S. Pat. No. 6,394,345, the contents of which are incorporated herein by reference.

The self-service checkout terminal 10 also includes an interactive customer interface terminal 58. The interactive customer interface terminal 58 includes a display monitor 58*a* which is provided to display retail information to the customer during operation of the self-service checkout terminal 10. For example, transaction information such as item price, item description, total amount of the transaction, instructions, etc. is displayed to the customer on the display monitor 58*a* during operation of the self-service checkout terminal 10.

The display monitor 58*a* preferably comprises an input device such as a touch screen monitor which can generate data signals when certain areas of the screen are touched by a customer. In addition to, or in lieu of, such a touch screen monitor input device, customer interface terminal 58 can comprise other input devices such as a keyboard, keypad, mouse, stylus, or other suitable input device or devices. Such input devices can be an integral part of display monitor 58*a* or connected to display monitor 58*a* by cables or wireless communication. Hence, the display monitor 58*a* and/or input devices connected to display monitor 58*a* may be utilized by the customer to input information into the self-service checkout terminal 10. For example, the customer may manually enter retail information such as PLU codes and quantities into the self-service checkout terminal 10 by use of the touch screen associated with the display monitor 58*a*. The customer may indicate his or her preferred method of payment (e.g. cash, credit, or debit card) by touching the appropriate area of the touch screen associated with the display monitor 58*a*. A portion of the touch screen associated with the display monitor 58*a* may also be utilized as a "help button" such that assistance is provided to the customer when it is touched by the customer.

Moreover, the interactive customer interface terminal 58 is preferably embodied as a stand-alone, kiosk-type device which is, in essence, a modified flat panel personal computer (PC) which includes a number of components commonly associated therewith. For example, the interactive customer interface terminal 58 preferably includes a processing unit (not shown), one or more speakers (not shown) for playing audio, and a video camera or still camera (not shown) to continuously or selectively photograph items placed on product scale 36 and/or scanned by scanner 34. The processing unit of the interactive customer interface terminal 58 may comprise a central processing unit of a PC, an application specific integrated circuit (ASIC), a field programmable gate array, or other processing units known to those skilled in the art. Customer interface terminal 58 also preferably comprises other commonly utilized PC components such as an Ethernet controller, a number of video and audio control devices, one or more storage or memory devices such as a hard drive device or main memory device (RAM or DRAM device, e.g.), and a number of connector ports for coupling the interface terminal 58 to a number of retail peripheral devices such as the scanner 34, the product scale 36, the components associated with the payment area 16, and the security scale 68. Hence, in addition to displaying transaction information to the customer, the interactive customer interface terminal 58 functions as the main processing device or controller for controlling operation of the self-service checkout terminal 10. It should be appreciated that the interactive customer interface terminal 58 may be embodied as any stand-alone, kiosk-type device which includes the aforedescribed components (e.g. a display monitor, PC etc.). One such stand-alone, kiosk-type device which is particularly useful as the interactive customer interface terminal is an Informa model information terminal which is commercially available from NCR Corporation. Interactive customer interface terminal 58 is also preferably connected to a database (or other data storage unit) for accessing and storing information. In certain embodiments, customer interface terminal 58 may also be connected to one or more remote computing devices, such as computing devices monitored by clerks or management personnel.

Security Checks Performed by Checkout Terminal

In operation, the self-service checkout terminal 10 may be utilized by a customer to perform a self-service checkout transaction. In particular, once the customer has selected all of his or her items for purchase from the shopping area of the retailer's store, the customer approaches the self-service checkout terminal 10. The customer then optionally utilizes one of the components 60 in the pre-scan area 12 to dock or otherwise support his or her shopping basket (not shown) or shopping cart (not shown). The customer may then perform a number of initialization steps such as identifying himself or herself so that the details of the customer's transaction can be tracked for purposes of recording and storing the shopper's transaction history and/or for the retailer's customer loyalty program. For example, the customer may scan an identification card comprising a bar code by using scanner 34, thus identifying himself or herself to the self-service checkout terminal 10. Alternatively, the customer may enter a unique identification number into interactive customer interface terminal 58 of self-service checkout terminal 10. Thereafter, the details of the customer's transaction (such as items and brands purchased, coupons used, methods of payment used, and the like) can be stored in a database (or other storage unit) for future use and association with the particular customer.

The customer then removes the individual items for purchase from his or her shopping basket or cart and thereafter individually enters the items into the self-service checkout terminal 10 by use of the scanner 34, the product scale 36, and/or the touch screen associated with the display monitor 58*a*. Specifically, the customer may enter an item by scanning the item with the scanner 34 in order to read the machine readable code thereon. Items which are sold by weight such as produce items may be entered by placing the item on the product scale 36 and thereafter entering a code such as a product lookup code (PLU) associated with the item via the touch screen associated with the display monitor 58*a*. As set forth in FIGS. 3-7, the main processing unit of the self-service checkout terminal 10 can perform a variety of security checks to verify the accuracy of the PLU code entered by the customer and flag suspicious transactions for recording and/or further action by a clerk or management personnel.

Figure 3:
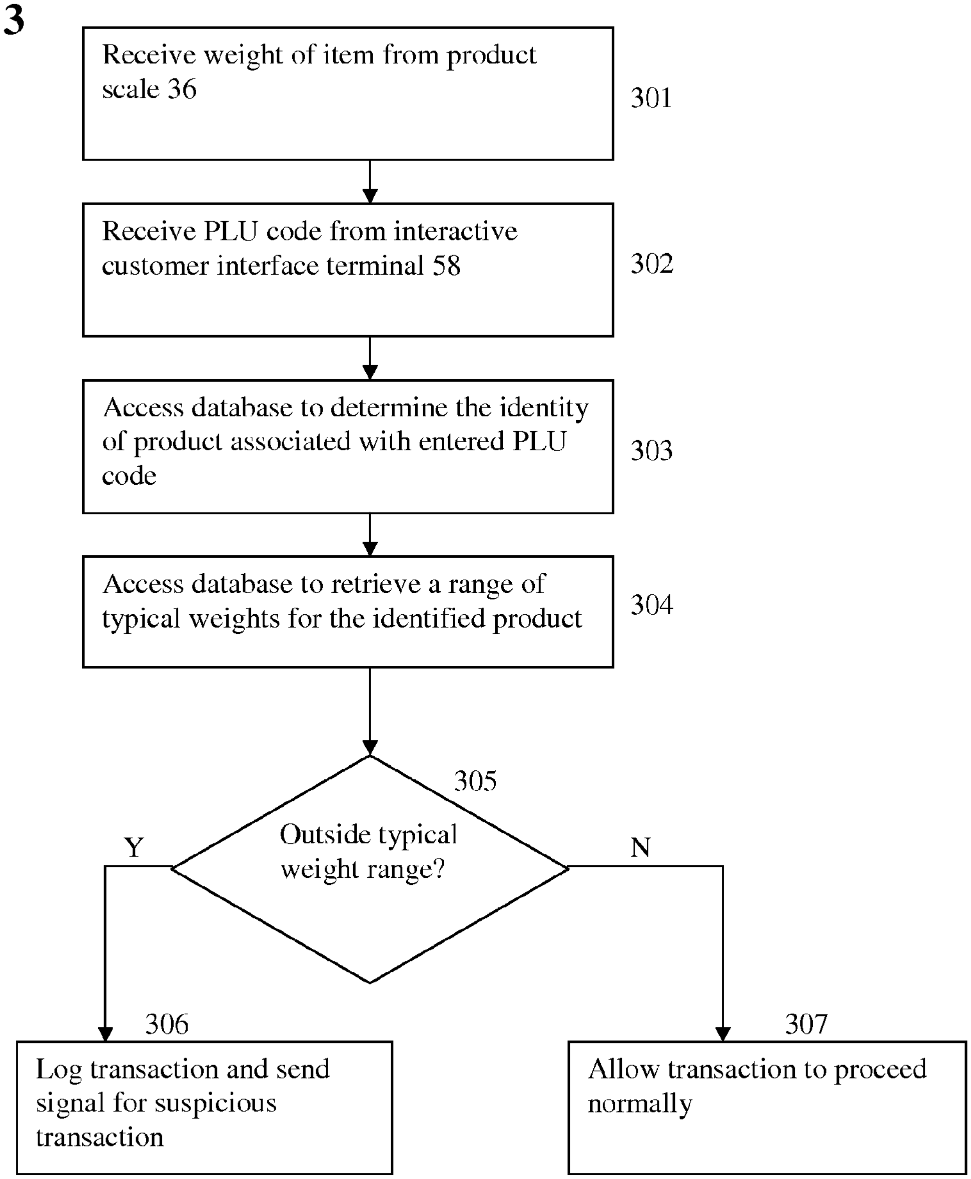
FIGS. 3-8 show flow diagrams for alternate embodiments for performing a security check.

Turning to FIG. 3, one method for performing a security check is disclosed. At step 301, the processing unit of the self-service checkout terminal 10 receives a signal from the product scale 36 containing the weight of the item placed on the product scale 36. At step 302, the processing unit receives a signal containing the PLU code that was entered by the customer into the interactive customer interface terminal 58. As described above, customer interface terminal 58 comprises an input device such as a touch screen or a keyboard.

At step 303, the processing unit accesses a database, memory, cache, or other storage device to determine the identity of the product corresponding to the PLU code that was entered by the customer. Such a database or storage device may be local to the self-service checkout terminal 10 or may be housed in a central server and accessed remotely.

At step 304, the processing unit accesses a database or other storage device to retrieve a range of weights that have previously been determined to represent a typical weight for the type of product identified in step 303. Such typical weights may be calculated by observing historical weight values for a given product. For example, a given retailer may have determined over time that customers generally purchase bananas in a weight range of ½ pound-3 pounds and that a banana purchase of 10 pounds is extremely rare. Some retailers may factor in additional considerations for determining typical weights, such as the time of day or day of the week. For example, the retailer may determine that bananas are more likely to be purchased in large quantities on the weekend from 12 pm-5 pm and that bananas are unlikely to be purchased at all on a weekday from 1 am-4 am. As another example, the retailer may determine that pumpkins are often sold in the weeks leading up to Halloween (October $31^{st}$) but rarely purchased at other times of the year. In some embodiments, a retailer may simply specify a range of typical weights rather than rely on historical averages. In some embodiments, the "range" of weights for a given product may comprise a single weight (5 pounds, e.g.) with a tolerance level (+/−10%, e.g.). In some embodiments, the tolerance level may be customized for each product and stored in the database. In other embodiments, the tolerance level may simply be a fixed percentage for all items. Those skilled in the art will appreciate that steps 303 and 304 may be combined into a single database access or other storage device access.

At step 305, the processing unit calculates whether the weight of the item placed on the product scale 36 lies within the range retrieved in step 304. If the measured weight falls in the normal range, the processing unit will allow the transaction to proceed normally as shown in step 307. However, if the measured weight falls outside the normal range, the processing unit will log the transaction in a database (or other storage device) and send a signal indicating that the transaction is suspicious. As described in more detail below with respect to FIGS. 8-9, the suspicious transaction signal can be processed by a remote clerk's device or by the self-service checkout terminal 10 itself.

In some embodiments, the processing unit will maintain a total (or aggregate) weight for all items in a given transaction that have been identified using the same PLU code. For example, if a first item weighing 3 pounds is identified using the PLU code for bananas and a second item weighing 5 pounds is later identified using the PLU code for bananas, the processing unit will calculate the aggregate weight of 8 pounds. In such embodiments, the aggregate weight for a given product (bananas, e.g.) may be used in step 305 in lieu of, or in addition to, the individual weights for the items placed on the product scale 36.

In some embodiments, the suspicious transaction will not be logged in step 306 or will only be logged if the weight is very far outside the typical range for the product. In some embodiments, the suspicious transaction signal will not be sent to a clerk's device but rather will trigger an audible or visual signal (such as an audible beep or a light on a light pole) indicating that a clerk or other employee should verify the transaction. In some embodiments, this audible or visual signal will be triggered in addition to transmittal of a suspicious transaction signal to a clerk's device or other device or database. In some embodiments, the processing unit will, at step 306, prohibit the transaction from proceeding until an override or verification is received from a clerk. In some embodiments, the processing unit will, at step 306, display a visual message to the customer on display monitor 58*a* (and/or play an audible message over a speaker) requesting that the customer verify the product, reposition the product on the product scale 36 in order to ensure that the product was accurately weighed and/or enter a new PLU code for the product or scan the product using scanner 34. In such embodiments, the suspicious transaction signal may not be forwarded to the remote clerk's computing device if the customer corrects the problem by entering in the correct PLU code and/or scanning the item correctly using scanner 34.

Figure 4:
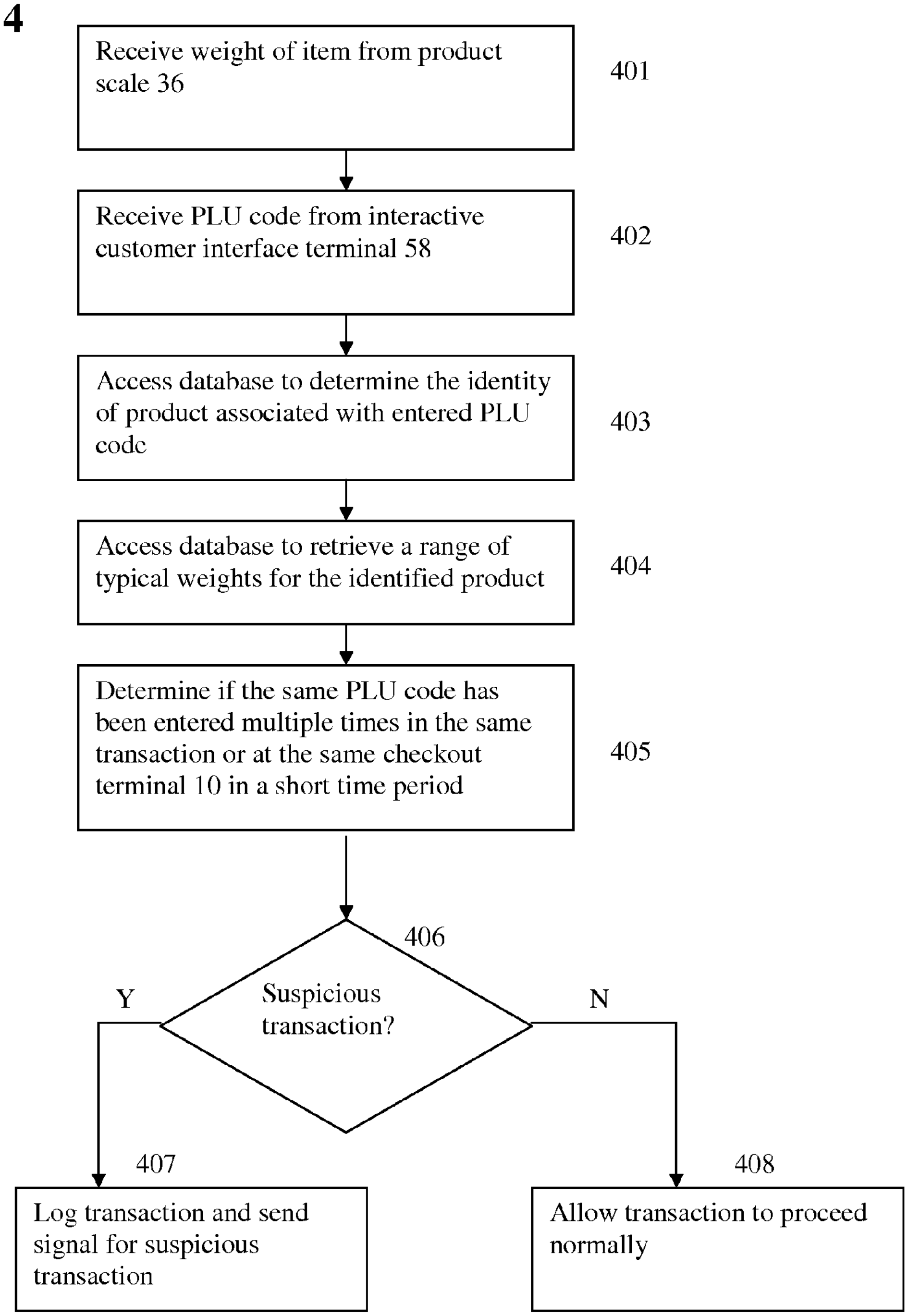

FIG. 4 shows another method for performing a security check. Steps 401-404 are similar to steps 301-304 described above. At step 405, the processing unit determines if the same PLU code has been entered multiple times in the same transaction. The repeated use of the same PLU code in a given transaction may indicate that the customer is repeatedly entering the PLU code for a low-cost item rather than enter the true PLU code or scanning the item's bar code or other indicia. For example, if a customer enters the PLU code for bananas 15 times in the same transaction, it may be that the customer is attempting to purchase expensive items (such as meat items, e.g.) at the low per-pound cost of bananas.

In some embodiments, the processing unit will determine whether the same PLU code has been entered multiple times on the same checkout terminal 10 in different transactions over a short period of time. For example, if five transactions in a row each comprise only the PLU code for bananas, then it may be that a single customer is attempting multiple fraudulent transactions at the same checkout terminal 10.

In some embodiments, the processing unit will determine whether the same PLU code is being entered abnormally often on adjacent or nearby checkout terminals, whether simultaneously or within a short period of time. In such embodiments, the individual checkout terminals would need to be connected to a central server (or to one another) in order to exchange information about the frequency of PLU code use at the various checkout terminals in the store. Simultaneous transactions with an abnormally high use of a given PLU code might indicate that one person (or a group of persons acting in concert) were attempting to initiate fraudulent transactions at the same time. Transactions over a short period of time with an abnormally frequent use of the same PLU code might indicate that a person was performing multiple fraudulent purchases at different checkout terminals. As an additional input for this calculation, the processing unit could factor in the distance between the various checkout terminals in the store. If anomalies appear on checkout terminals located close to one another, such transactions could receive more scrutiny than if the terminals were relatively far apart because it would be more likely for a single person to enter simultaneous fraudulent transactions on checkout terminals located close to one another.

At step 406, the processing unit would analyze the frequency of the use of the same PLU code calculated in step 405 as well as the overall weight for the item in comparison with the average weight for purchases of the item as determined in step 404. If the overall weight for the item falls outside the normal expected weight or if the frequency of the same PLU code is unacceptably high, then the processing unit will determine that a suspicious transaction has occurred. In some embodiments, an anomaly in the frequent use of a PLU code will lower the acceptable weight range for the product. For example, if the normal weight range for bananas is ½ pound-3 pounds, the use of the banana PLU code for 5 times in a single transaction may reduce the acceptable normal weight range to ½ pound-2 pounds. After analyzing the aforementioned factors, the processing unit will allow the transaction to proceed normally at step 408 if it is determined that the transaction lies within an acceptable range. Otherwise, the processing unit will log the transaction at step 407 and/or send a suspicious transaction signal.

Those skilled in the art will appreciate that the various alternate embodiments described above with respect to FIG. 3 may also be combined with the method described in FIG. 4. For example, the optional audible or visual signals described above (such as an audible beep or a light on a light pole) may also be used in various embodiments incorporating the features of the method described in FIG. 4.

Figure 5:
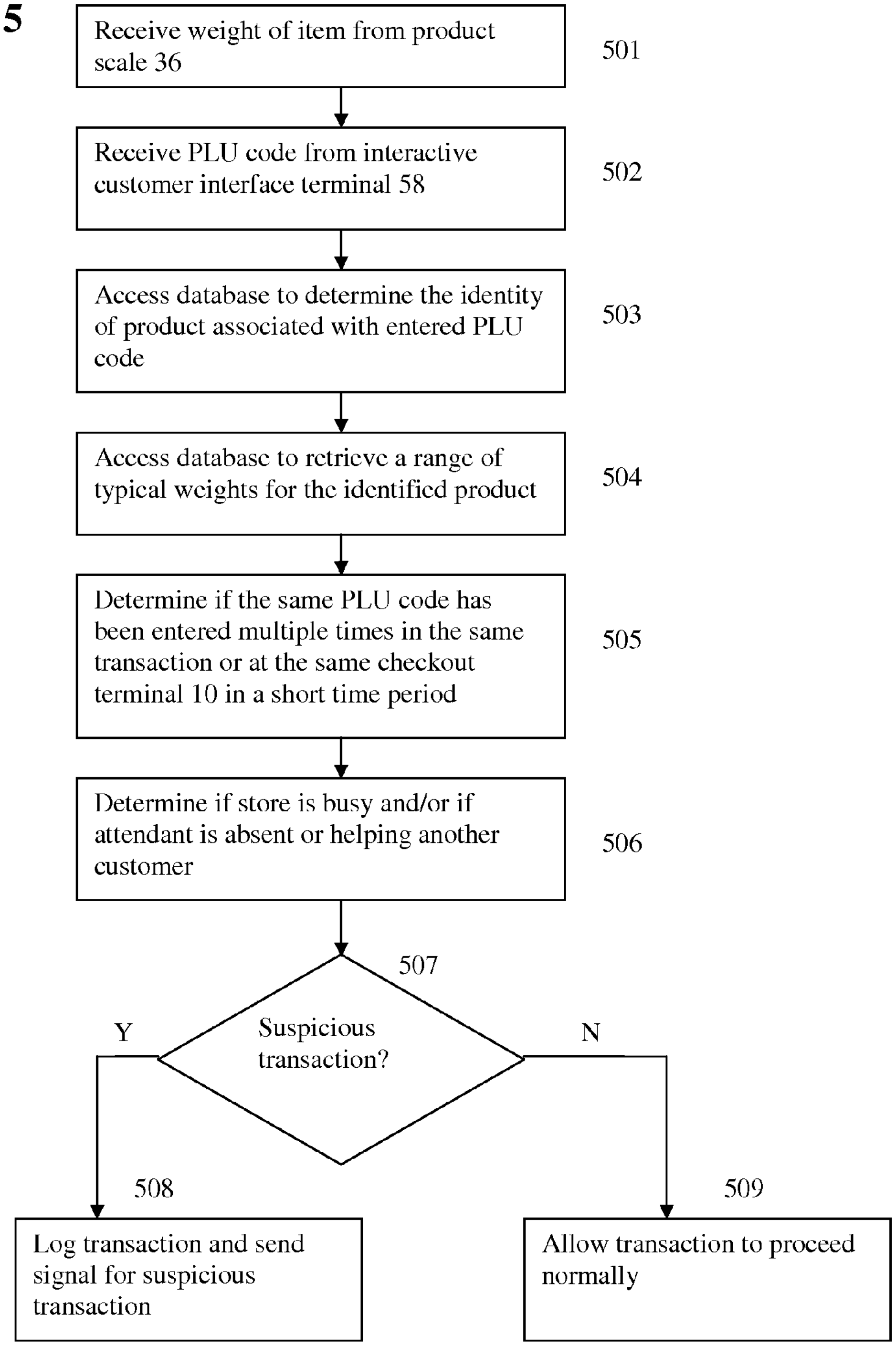

FIG. 5 shows another embodiment of a method for performing a security check. The method shown in FIG. 5 is similar to the method of FIG. 4 for steps 501-505. At step 506, the processing unit determines if the store is busy and/or if the clerk or other attendant is absent or busy helping another customer. A busy store or an absent or preoccupied clerk may entice unscrupulous persons to attempt to conduct fraudulent transactions in the belief that there is little or no supervision of their actions.

The processing unit may determine if the store is busy based on the number of transactions simultaneously being processed on various checkout terminals within the store and/or the ratio of working employees to active simultaneous transactions. In such embodiments, the various checkout terminals are preferably connected to a central server and/or to one another in order to share status information about their state (processing a transaction, not processing a transaction, in standby mode, turned off, etc.). In some embodiments, the time of day may be used as a factor to determine if the store is busy. For example, the store may be presumed to be busy from 4 pm-6 pm Monday-Friday.

In some embodiments, the processor will determine if the attendant is helping another customer and/or away from the attendant's assigned post. For example, if the attendant has not logged in to the attendant's station or other device (such as a portable clerk's computing device), then it may be an indication that the attendant is absent. Alternatively, if a help signal or suspicious transaction signal has been sent to the attendant by a different checkout terminal, then the processing units of the other checkout terminals in the store may register that the attendant is busy.

In some embodiments, the processor may utilize the time of day to heighten security requirements. For example, it may be known that thefts or fraudulent transactions are more likely to occur in the early morning hours (e.g., from 1 am-4 am) than during other times of the day. In such embodiments, the processor may be programmed with more stringent criteria for detecting suspicious transactions.

At step 507, the processor will utilize the various factors identified above to determine if the transaction is suspicious. If the attendant is absent or busy, then the criteria for determining whether the transaction is suspicious may be tightened. (i.e., the acceptable weight ranges for various products may be reduced.) Similarly, if the store is busy or the time of day is calculated to be a high-theft time, then the criteria for determining suspicious transactions may be tightened.

Figure 6:
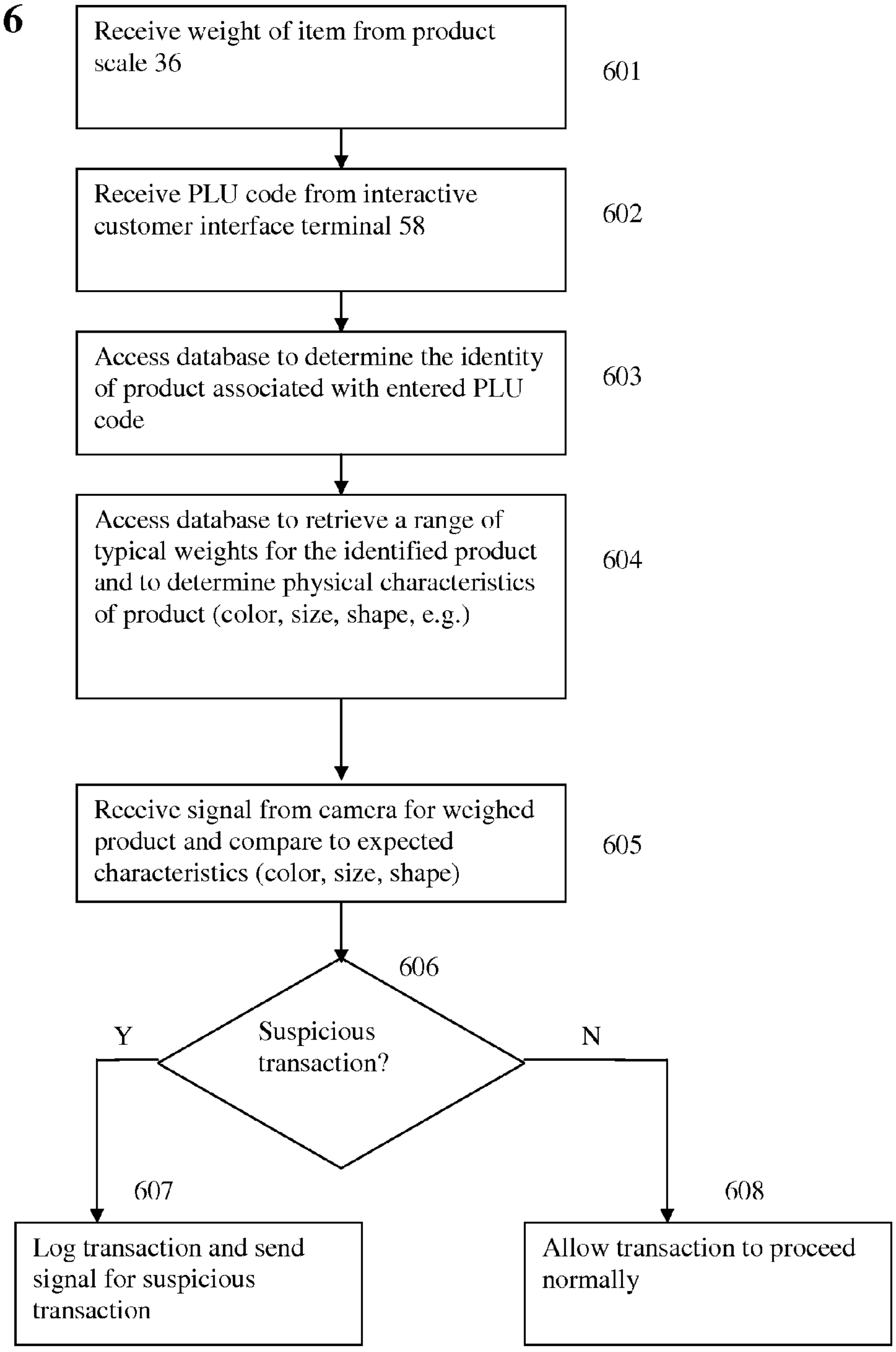

FIG. 6 discloses another alternative embodiment of a method for performing a security check. Steps 601-603 are similar to steps 501-503. At step 604, the processing unit accesses a database (or other storage unit) to retrieve a range of typical weights for the product corresponding to the entered PLU (similar to step 504). In addition, the processing unit retrieves some physical characteristics (such as color, size, shape, and/or texture) for the product. For example, if the customer entered the PLU for bananas in step 602, then the processing unit would access the database and determine that bananas are typically yellow and have a curved shape. In some embodiments, the data supplied by the database will contain detailed dimensional details that can be used for analysis purposes as described below.

At step 605, the processing unit receives a signal from a video camera (or still camera) representing an image of the product placed on product scale 36. The processing unit then compares the image in the received video signal with the data regarding physical characteristics received in step 604. If the image contained in the video signal matches poorly with the expected physical characteristics of the product, then the mismatch may reflect a fraudulent transaction. For example, if a customer places a reddish-brown beef steak on product scale 36 and enters the PLU code for bananas, the processing unit may note the mismatch between the expected yellow color for bananas and the perceived reddish-brown color of the steak. In certain embodiments, the processing unit can utilize dimensional data (such as expected contours and proportions) to further identify anomalous transactions. To continue with the previous example, a banana is expected to have a long, slightly curved shape, a rounded cross-section, and a tip that is darker and of a different texture than the main body of the fruit. By contrast, a beef steak is generally flat and somewhat rectangular in shape. Utilizing shape recognition software, the processing unit can utilize this information to detect the discrepancy between the expected banana shape and the observed beef steak shape. In some embodiments, such shape recognition software can utilize adaptive learning or artificial intelligence to learn to recognize the physical characteristics of certain items over time. For example, such adaptive learning software may gradually recognize the typical colors and shapes associated with bananas by repeatedly observing items that are identified by various customers using the PLU code for bananas.

In some embodiments, alternate sensing devices can be used in addition to, or in lieu of, a camera. For example, some embodiments can utilize x-ray detectors, infrared detectors, capacitive sensors, olfactory detectors, ultrasound detectors, or other sensing devices to detect various physical characteristics of the item being placed on the product scale 36. Such embodiments may also use adaptive learning software to recognize and tabulate the typical physical characteristics of items over time.

At step 606, the processing unit will utilize the various factors identified in steps 601-605 in order to determine if the transaction is suspicious or not. The processing unit can be programmed to take into account the amount by which the observed product differs from expected parameters. For example, if the observed product greatly deviates in color, shape, and smell from the expected color, shape, and smell, then the transaction may still be flagged as suspicious even if the measured weight falls within the expected range. By contrast, if the observed product only slightly deviates in color, shape, or smell from the norm, then the transaction may be classified as non-suspicious if the measured weight falls within the expected range (or very slightly outside the expected range).

Figure 7:
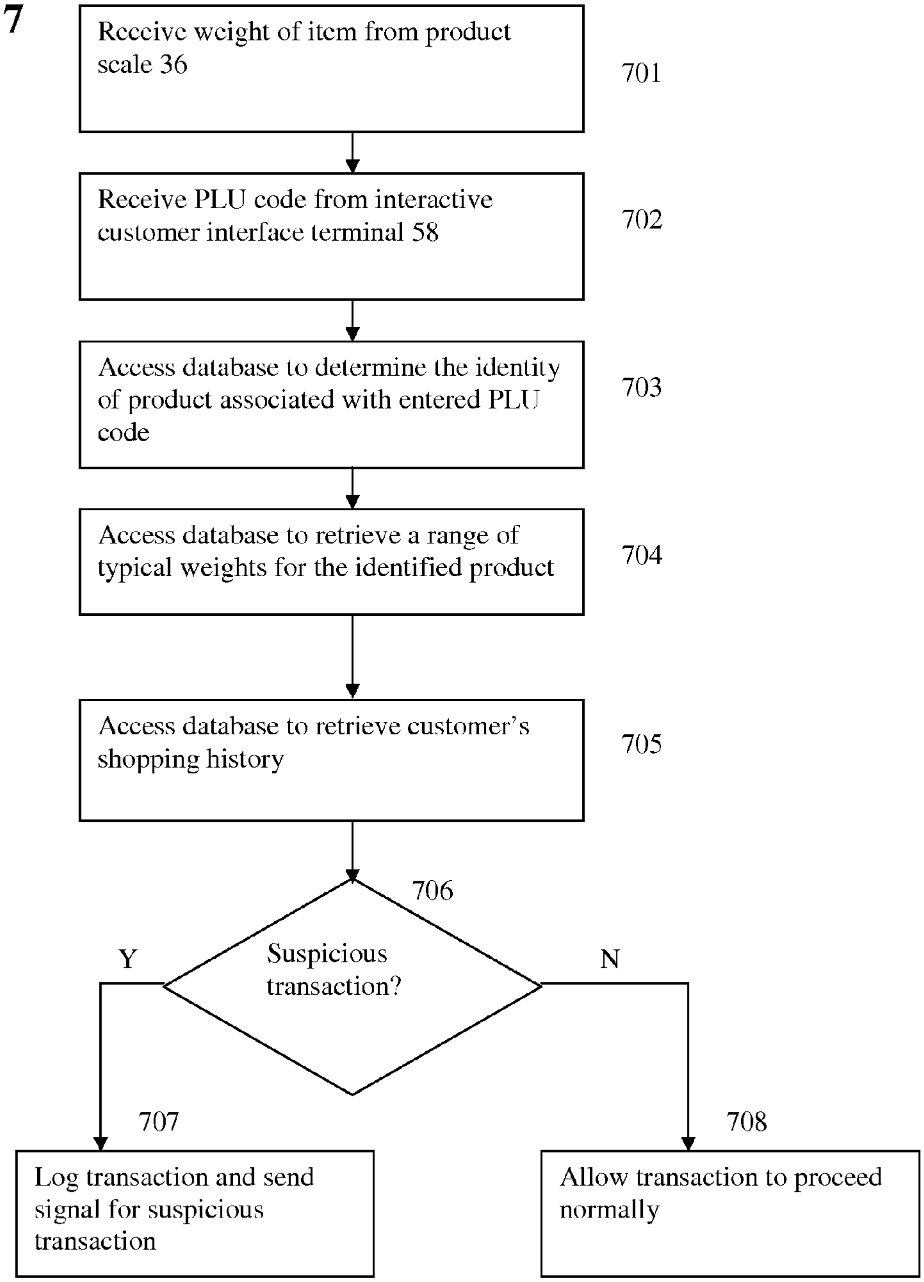

FIG. 7 shows an alternate method for performing a security check utilizing the customer's previously identified shopping habits (i.e., the customer's transaction history from previous transactions). Prior to initiating the security check of FIG. 7, the customer will have identified himself or herself to the checkout terminal 10. Specifically, as described above, the customer will have scanned an identification card using scanner 34 or entered a unique identification number into interactive customer interface terminal 58 or otherwise identified himself or herself to the checkout terminal 10.

Steps 701-704 are similar to steps 501-504. At step 705, the processing unit will access a database (or other storage device) to retrieve the customer's shopping history and/or a customer profile containing average shopping history data. Such data can include the average weights for certain items typically purchased by the customer in the past. For example, if a given customer often buys a large quantity of bananas in a single transaction (5-10 pounds, e.g.), then this information can be used to override the weight range for a typical customer (½-3 pounds, e.g.) identified in step 704. Consequently, the security check method of FIG. 7 will avoid flagging the transaction as suspicious.

The historical data retrieved in step 705 may also include data related to the frequency or time of day of the customer's visits. For example, if the customer regularly shops at the retailer every week on Saturday afternoon between 1 pm and 5 pm, this pattern can be stored in the retailer's database and used to detect shopping anomalies. Similarly, the historical data can record the various non-weighed items such as boxed or packaged items that are scanned by UPC code or other indicia. If the processing unit detects that the identified customer is purchasing a basket of items that are atypical for the customer, then the transaction may be flagged as suspicious. (i.e., the customer's identification card may have stolen and used by an unauthorized individual.)

Based on the customer's personal shopping history as well as typical weight ranges for the weighed product, the processor, at step 706 will assess whether the transaction is suspicious or not. As with the alternate embodiments described above with respect to FIGS. 3-6, the processor will then either let the transaction proceed normally as shown in step 708 or will flag the transaction as suspicious in step 707.

Those skilled in the art will appreciate that the various alternate embodiments described above may be combined or modified to create yet other alternate embodiments. For example, one alternate embodiment could include the steps shown in FIG. 5 combined with steps 604 and 605 (FIG. 6) and step 705 (FIG. 7). In other embodiments, certain steps could be omitted.

Figure 8:
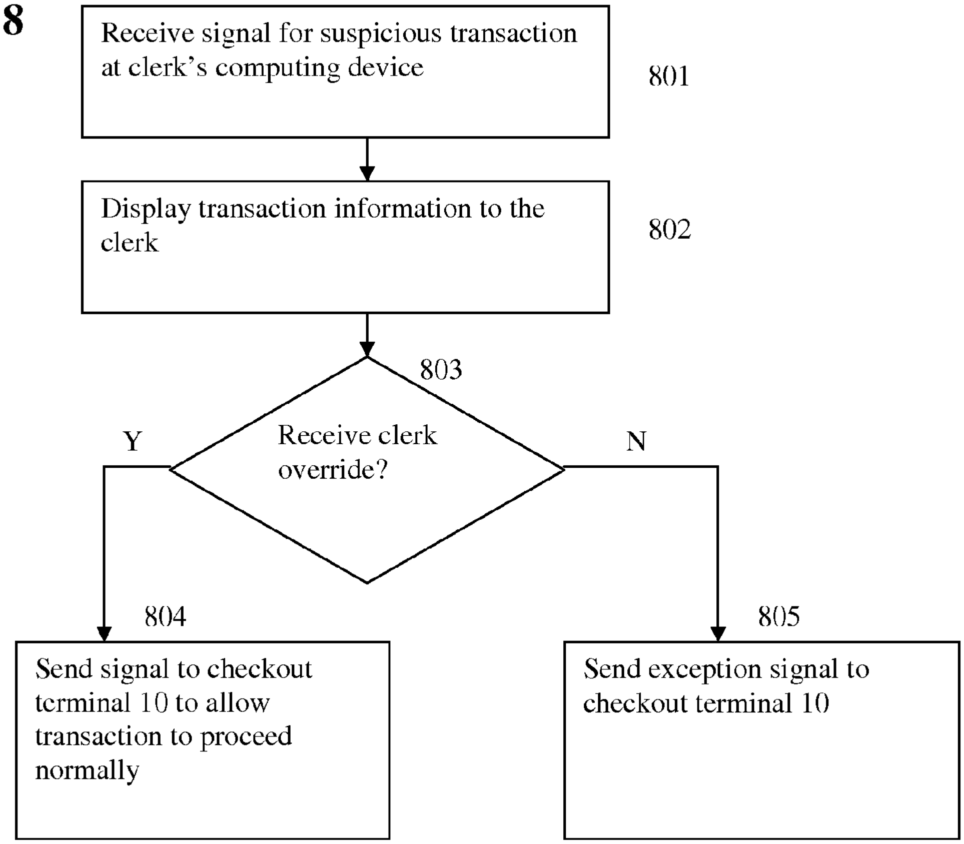
Figure 9:
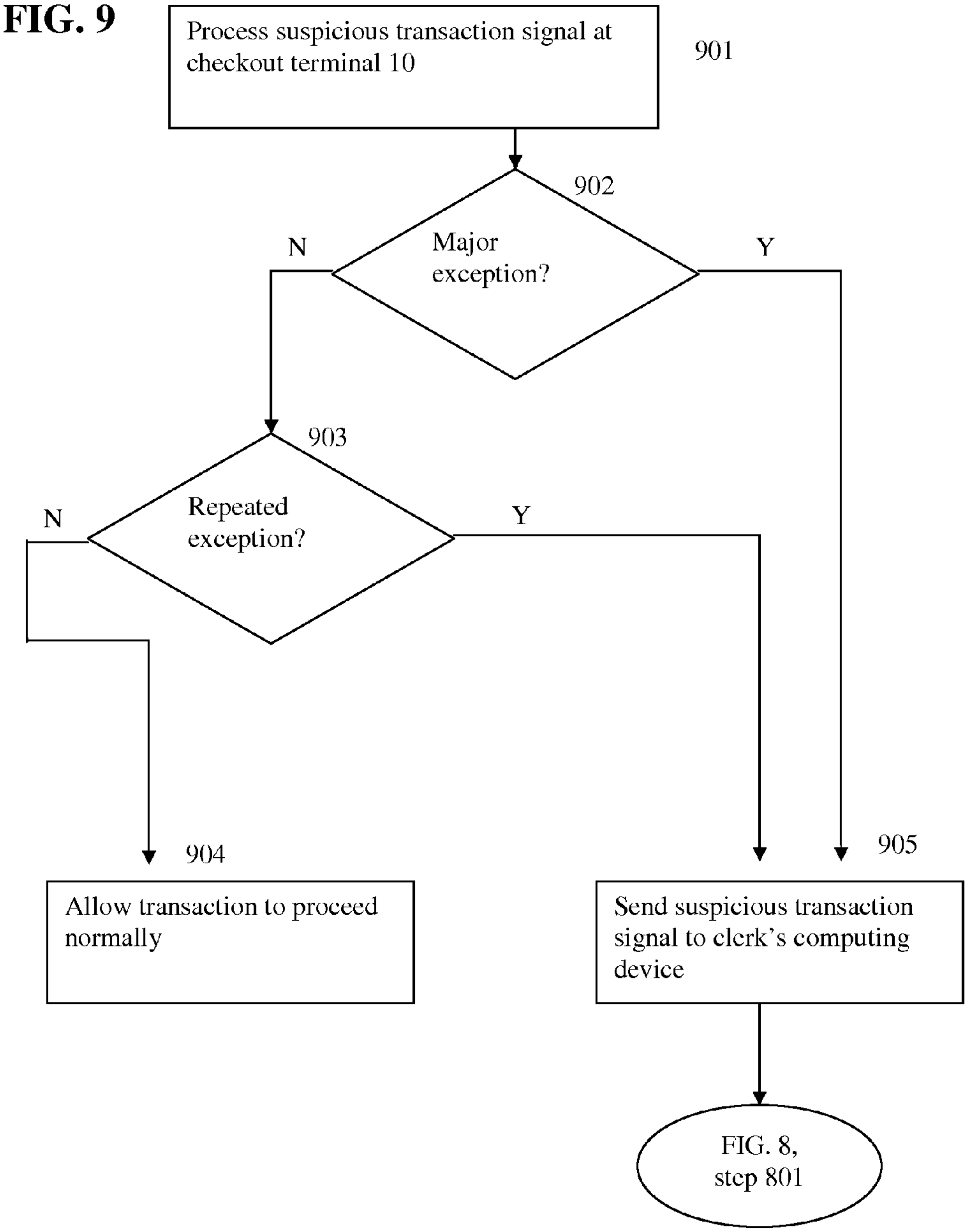
FIG. 9 shows a flow diagram for an alternate embodiment for processing a suspicious transaction signal generated by a checkout terminal.

Turning to FIGS. 8-9, two alternate methods for processing a suspicious transaction signal are disclosed. As described above in relation to FIGS. 3-7, a suspicious transaction signal is generated by the processing unit of the checkout terminal 10 at steps 306, 407, 508, 607, and 707, respectively, if a suspicious transaction is detected.

FIG. 8 shows a method for processing a suspicious transaction signal by immediately sending the signal to a clerk's computing device. Such a device may comprise a handheld computer or other portable device. Alternatively, such a clerk's computing device could comprise a fixed computing device at a clerk's attendant station, for example. Preferably, the clerk's computing device will be in wireless or wired communication with one or more checkout terminals 10 within the store. Such communications between the one or more checkout terminals 10 and the clerk's computing device may pass through a central server, router, or other communications device. The clerk's computing device preferably comprises output means such as a video display for displaying visual information. In certain embodiments, the clerk's computing device may comprise a speaker or other audio output device for conveying audible information to the clerk. The clerk's computing device may also comprise input means such as a keyboard, touch screen, stylus, buttons, or other input means.

At step 801, the clerk's computing device receives the suspicious transaction signal from the checkout terminal 10. At step 802, the suspicious transaction signal is processed and displayed to the clerk (and/or an audible notification may be presented to the clerk.) The information displayed or otherwise presented to the clerk preferably includes an identification of the checkout terminal 10 that generated the suspicious transaction signal. In some embodiments, the displayed information may include a complete or partial summary of the transaction. For example, the displayed information may include the weight and identity of the item that triggered the suspicious transaction signal. (e.g., bananas—10 pounds). In some embodiments, the information will include the normal or expected weight range for the item. (e.g., bananas, normal range: ½ pound-3 pounds). In some embodiments, the information will include a photograph or video image of the suspicious item and/or the customer as captured by the checkout terminal 10. In some embodiments, the information will include the number of times the same PLU code was entered by the customer. (e.g., bananas—PLU code entered 7 times).

After receiving the information, the clerk may investigate the suspicious transaction by walking over to the checkout terminal 10 that generated the suspicious transaction signal. The clerk can then visually inspect the suspicious item and/or the other items that the customer has already scanned. If the clerk believes that an incorrect PLU code has been entered for a given item, the clerk can prompt the customer to enter the correct PLU code or alternatively contact security if the customer is uncooperative or attempts to abscond with the merchandise without making proper payment.

In some embodiments, the checkout terminal 10 will not permit the customer to continue the transaction until the clerk overrides or resets the checkout terminal 10. In other embodiments, the checkout terminal 10 will permit the transaction to continue up to the payment phase even if a potentially suspicious transaction has been detected. In yet other embodiments, the checkout terminal 10 will permit the transaction to continue to completion so long as a limited number (e.g., 2 or fewer) suspicious transaction signals have been raised and/or so long as the transaction anomalies are not severe. (e.g., an item falling less than 5% outside the normal weight range).

At step 803, the clerk will decide whether to override the suspicious transaction signal to allow the transaction to continue. In some embodiments, the clerk can override or reset the checkout terminal 10 by entering a code or other input into the input device of the customer interface terminal 58 of the checkout terminal 10. In some embodiments, the clerk can override or reset the checkout terminal by entering a code or other input into the clerk's computing device.

If the clerk decides to override the checkout terminal 10, a signal will be sent to (or entered into) checkout terminal 10 to allow the transaction to continue normally as shown in step 804. In some embodiments, the clerk can send an exception signal to the checkout terminal 10 indicating that the transaction should be stopped until further review is undertaken as shown in step 805. In some embodiments, the clerk can notify security or management personnel by sending an exception signal to computing devices respectively associated with security or management personnel. In other embodiments, the clerk can telephone security or management and/or use portable radio or other communication means.

In some embodiments, the clerk may decide whether to override or reset the checkout terminal 10 based solely on the information presented to the clerk in step 802. That is, the clerk may view the information on his or her computing device (such as a video image of the item along with the item's weight) and decide whether to override the checkout terminal 10 without walking over to the checkout terminal 10 for an in-person inspection.

In some embodiments, the checkout terminal 10 may emit an audible or visual signal (such as an audible beep or a light on a light pole) instead of, or in addition to, a suspicious transaction signal. In such embodiments, the clerk can respond to the audible or visual signal by walking over to the checkout terminal 10 to investigate the transaction.

In some embodiments, suspicious transaction signals can automatically be sent to management or security personnel in addition to, or in lieu of, a clerk or attendant. In some embodiments, only suspicious transactions that meet a higher threshold are automatically sent to management or security personnel. For example, a transaction involving an item that is at least 5 times over the expected maximum weight limit may be sent to management or security personnel for their immediate review.

FIG. 9 shows an alternate method for processing a suspicious transaction signal wherein the suspicious transaction signal is only forwarded to the clerk's computing device in certain situations. At step 901, the processing unit of the checkout terminal 10 begins processing of the suspicious transaction signal. At step 902, the processing unit determines whether the suspicious transaction is a major exception or a minor exception. For example, if the item being weighed on the product scale 36 is greatly outside the expected weight range (e.g., greater than 20% above the maximum expected weight), then the processing unit may immediately forward the suspicious transaction signal to the clerk's computing device as shown in step 905. In another example, if the processing unit determines that there is a complete mismatch between the expected color of the weighed item and the actual color of the item, then the processing unit may proceed to step 905 and immediately forward the suspicious transaction signal to the clerk's computing device.

If the suspicious transaction signal is only a minor exception, the method proceeds to step 903 where the processing unit will analyze the number of suspicious transaction signals received in the same transaction. If the transaction has generated repeated (e.g., 3 or more) suspicious transaction signals, then the processing unit may proceed to step 905 and forward the suspicious transaction signal(s) to the clerk's computing device. In some embodiments, the processing unit may also analyze whether an abnormally high number of suspicious transaction signals have been generated in separate transactions at the same checkout terminal (or at other checkout terminals in the store). Such embodiments may optionally factor in the distance between checkout terminals that generate suspicious transaction signals and/or the timing between the generation of suspicious transaction signals. As discussed above in relation to FIGS. 3-7, an abnormally high number of suspicious transaction signals over a short period of time at nearby checkout terminals may warrant a higher level of scrutiny. In some embodiments, steps 902 and 903 can be combined into a single step in which the processing unit calculates a combined score based on the combination of the severity and frequency of the suspicious transaction signals.

If the processing unit determines that the suspicious transaction signal is not severe enough and has not been repeated abnormally often, then the processing unit will proceed to step 904 and allow the transaction to proceed normally. As noted above with respect to FIGS. 3-7, the processing unit will already have logged the suspicious transaction signal in a database (and/or in another storage device or main memory) so the processing unit will have a record of the suspicious transaction signal if another suspicious transaction signal is raised.

If the processing unit determines that the suspicious transaction signal should be forwarded to the clerk's computing device (and/or security or management personnel), then the method will proceed to step 905. Thereafter, the method may continue as shown in FIG. 8 and as discussed above in relation thereto.

Those skilled in the art will appreciate that the system and method disclosed herein may be utilized in conjunction with many different types of self-service checkout terminals in addition to the self-service checkout terminal shown in FIGS. 1-2. In addition, the system and method disclosed herein may be utilized in conjunction with many different types of assisted checkout terminals. As discussed above, an unscrupulous clerk operating an assisted checkout terminal can collude with the customer to fraudulently purchase an item for a low price by purposely entering an improper PLU code into the assisted checkout terminal or otherwise improperly scanning the item. The system and method described herein can therefore be used to monitor a clerk that is operating an assisted checkout terminal to detect any such fraudulent transactions.

Accordingly, while the invention has been described with reference to the structures and processes disclosed, it is not confined to the details set forth, but is intended to cover such modifications or changes as may fall within the scope of the following claims.

What is claimed is:

1. A method for performing a security check during a transaction conducted using a checkout terminal, wherein said checkout terminal comprises a product scale, an input device, and a processing unit, the method comprising the steps of:

a) receiving at said processing unit a first signal encoding the weight of an item placed on said product scale;

b) receiving at said processing unit a second signal encoding identification information about the item placed on the product scale;

c) receiving at said processing unit a third signal encoding physical characteristic information about the item placed on the product scale;

d) accessing, by said processing unit, a storage unit to retrieve an expected weight range and expected physical characteristic information for a product corresponding to said identification information; and e) comparing the weight received in step (a) with the expected weight range from step (d) and the physical characteristic information received in step (c) with the expected physical characteristic information from step (d).

2. The method of claim 1 further comprising the step of:

f) classifying the transaction as suspicious when the weight received in step (a) lies outside the weight range of step (d) or the physical characteristic information received in step (c) fails to match the expected physical characteristic information of step (d).

3. A method for performing a security check during a transaction conducted using a checkout terminal, wherein said checkout terminal comprises a product scale, an input device, and a processing unit, the method comprising the steps of:

a) receiving at said processing unit a first signal encoding the weight of an item placed on said product scale;

b) receiving at said processing unit a second signal encoding identification information about the item placed on the product scale;

c) accessing, by said processing unit, a storage unit to retrieve an expected weight range for a product corresponding to said identification information; and d) calculating an aggregate weight by adding the weight received in step (a) to any previously measured weights for previous items in the same transaction corresponding to said identification information.

4. The method of claim 3 further comprising the steps of:

e) comparing the aggregate weight calculated in step (d) with the expected weight range from step (c); and f) classifying the transaction as suspicious if the aggregate weight calculated in step (d) lies outside the weight range of step (c).

5. The method of claim 4 further comprising the step of:

g) transmitting a third signal to a remote computing device if the transaction has been classified as suspicious in step (f).

6. The method of claim 5 further comprising the step of:

h) halting further processing of the transaction.

7. The method of claim 6 further comprising the step of:

i) receiving an override signal at said processing unit and allowing said transaction to continue.

8. The method of claim 4 wherein said expected weight range from step (c) has been tailored to an identified customer who is conducting the transaction, wherein said tailoring is based on a past shopping history for said identified customer.

9. The method of claim 3 further comprising the steps of:

e) comparing the aggregate weight calculated in step (d) with the expected weight range from step (c);

f) determining if the identification information received in step (b) is identical to identification information previously received in the same transaction for one or more previous items;

g) classifying the transaction as suspicious based on (i) the amount, if any, by which the aggregate weight calculated in step (d) lies outside the weight range of step (c), and (ii) the number of times identical identification information has been received during the transaction as determined in step (f).

10. The method of claim 3 wherein the checkout terminal is located within a store, the method further comprising the steps of:

e) comparing the aggregate weight calculated in step (d) with the expected weight range from step (c);

f) determining how busy the store is based on (i) the number of concurrent transactions being conducted inside the store, or (ii) the time of day; and g) classifying the transaction as suspicious based on (i) the amount, if any, by which the aggregate weight calculated in step (d) lies outside the weight range of step (c), and (ii) how busy the store is as calculated in step (f).

11. The method of claim 3 further comprising the steps of:

e) comparing the aggregate weight calculated in step (d) with the expected weight range from step (c);

f) determining if a clerk is absent or helping another customer; and g) classifying the transaction as suspicious based on (i) the amount, if any, by which the aggregate weight calculated in step (d) lies outside the weight range of step (c), and (ii) whether the clerk is absent or helping another customer.

12. The method of claim 3 wherein the checkout terminal further comprises a camera configured to view items placed on the product scale, the method further comprising the steps of:

e) comparing the aggregate weight calculated in step (d) with the expected weight range from step (c);

f) receiving at said processing unit a third signal from said camera, said third signal encoding visual information about the item placed on the product scale;

g) accessing, by said processing unit, a storage unit to retrieve expected physical characteristics for a product corresponding to said identification information;

h) comparing the visual information received in step (f) with the expected physical characteristics received in step (g); and i) classifying the transaction as suspicious based on (i) the amount, if any, by which the aggregate weight calculated in step (d) lies outside the weight range of step (c), and (ii) the degree, if any, by which the visual information received in step (f) differs from the expected physical characteristics received in step (g).

13. A checkout terminal comprising:

a product scale, an input device, and a processing unit;

wherein the checkout terminal is in communication with a storage unit; and wherein the processing unit of the checkout terminal is configured to conduct a security check during a transaction by performing the steps of:

a) receiving a first signal encoding the weight of an item placed on said product scale;

b) receiving a second signal encoding identification information about the item placed on the product scale;

c) accessing the storage unit to retrieve an expected weight range for a product corresponding to said identification information; and d) calculating an aggregate weight by adding the weight received in step (a) to any previously measured weights for previous items in the same transaction corresponding to said identification information.

14. The checkout terminal of claim 13 wherein the processing unit of said checkout terminal is further configured to perform the steps of:

e) comparing the aggregate weight calculated in step (d) with the expected weight range from step (c); and f) classifying the transaction as suspicious if the aggregate weight calculated in step (d) lies outside the weight range of step (c).

15. The checkout terminal of claim 14 wherein the processing unit of said checkout terminal is further configured to perform the step of:

g) transmitting a third signal to a remote computing device if the transaction has been classified as suspicious in step (f).

16. The checkout terminal of claim 14 wherein said expected weight range from step (c) has been tailored to an identified customer who is conducting the transaction, wherein said tailoring is based on a past shopping history for said identified customer.

17. The checkout terminal of claim 13 wherein the processing unit of said checkout terminal is further configured to perform the steps of:

e) comparing the aggregate weight calculated in step (d) with the expected weight range from step (c);

f) determining if the identification information received in step (b) is identical to identification information previously received in the same transaction for one or more previous items;

g) classifying the transaction as suspicious based on (i) the amount, if any, by which the aggregate weight calculated in step (d) lies outside the weight range of step (c), and (ii) the number of times identical identification information has been received during the transaction as determined in step (f).

18. The checkout terminal of claim 13 wherein said checkout terminal is located within a store, and wherein the processing unit of said checkout terminal is further configured to perform the steps of:

e) comparing the aggregate weight calculated in step (d) with the expected weight range from step (c);

f) determining how busy the store is based on (i) the number of concurrent transactions being conducted inside the store, or (ii) the time of day; and g) classifying the transaction as suspicious based on (i) the amount, if any, by which the aggregate weight calculated in step (d) lies outside the weight range of step (c), and (ii) how busy the store is as calculated in step (f).

19. The checkout terminal of claim 13 wherein the processing unit of said checkout terminal is further configured to perform the steps of:

e) comparing the aggregate weight calculated in step (d) with the expected weight range from step (c);

f) determining if a clerk is absent or helping another customer; and g) classifying the transaction as suspicious based on (i) the amount, if any, by which the aggregate weight calculated in step (d) lies outside the weight range of step (c), and (ii) whether the clerk is absent or helping another customer.

20. The checkout terminal of claim 13 wherein said checkout terminal further comprises a camera configured to view items placed on the product scale, and wherein the processing unit of said checkout terminal is further configured to perform the steps of:

e) comparing the aggregate weight calculated in step (d) with the expected weight range from step (c);

f) receiving at said processing unit a third signal from said camera, said third signal encoding visual information about the item placed on the product scale;

g) accessing a storage unit to retrieve expected physical characteristics for a product corresponding to said identification information;

h) comparing the visual information received in step (f) with the expected physical characteristics received in step (g); and i) classifying the transaction as suspicious based on (i) the amount, if any, by which the aggregate weight calculated in step (d) lies outside the weight range of step (c), and (ii) the degree, if any, by which the visual information received in step (f) differs from the expected physical characteristics received in step (g).

* * * * *